(12) United States Patent
Kristlbauer

(10) Patent No.: US 9,664,264 B2
(45) Date of Patent: May 30, 2017

(54) MOTORIZED BEVERAGE MACHINE WITH MECHANICAL TRANSMISSION

(75) Inventor: Jurgen Kristlbauer, Zollikofen (CH)

(73) Assignee: Nestec S.A., Vevey (CH)

( * ) Notice: Subject to any disclaimer, the term of this patent is extended or adjusted under 35 U.S.C. 154(b) by 914 days.

(21) Appl. No.: 13/976,279

(22) PCT Filed: Jan. 3, 2012

(86) PCT No.: PCT/EP2012/050033
§ 371 (c)(1),
(2), (4) Date: Jun. 26, 2013

(87) PCT Pub. No.: WO2012/093108
PCT Pub. Date: Jul. 12, 2012

(65) Prior Publication Data
US 2013/0276638 A1     Oct. 24, 2013

(30) Foreign Application Priority Data
Jan. 3, 2011   (EP) .................................... 11150023

(51) Int. Cl.
| | | |
|---|---|---|
| *A47J 31/06* | (2006.01) | |
| *F16H 19/08* | (2006.01) | |
| *A47J 31/40* | (2006.01) | |
| *B65D 85/804* | (2006.01) | |
| *A47J 31/36* | (2006.01) | |

(52) U.S. Cl.
CPC .......... *F16H 19/08* (2013.01); *A47J 31/3633* (2013.01); *A47J 31/3676* (2013.01); *A47J 31/407* (2013.01); *A47J 31/3614* (2013.01); *B65D 85/8043* (2013.01); *Y10T 74/18088* (2015.01)

(58) Field of Classification Search
CPC ...... A47J 31/407; A47J 31/58; A47J 31/4403; A47J 31/3614; A47J 31/0663; A47J 31/20; A47J 31/52; A47J 31/3604; A47J 31/3633; A47J 31/3676; B65D 85/8043; F16H 19/04; F16H 19/08; B23Q 1/58; Y10T 74/18088
USPC ....... 99/295, 289 R, 302 R, 297, 302 P, 280; 74/29, 89.32
See application file for complete search history.

(56) References Cited

U.S. PATENT DOCUMENTS

| | | | | |
|---|---|---|---|---|
| 2008/0276807 | A1* | 11/2008 | Righetti | A47J 31/36 99/289 R |
| 2010/0147091 | A1* | 6/2010 | Buttiker | A47J 31/3614 74/89.32 |
| 2011/0048242 | A1* | 3/2011 | Stefanoni | A47J 31/0678 99/289 R |

FOREIGN PATENT DOCUMENTS

EP            1767129            3/2007

* cited by examiner

*Primary Examiner* — Quang D Thanh
*Assistant Examiner* — Hemant Mathew
(74) *Attorney, Agent, or Firm* — K&L Gates LLP

(57) ABSTRACT

A machine (1) for preparing a beverage comprises: a first part (20) and a second part (30) movable relative to the first part; a motor (51,51') having a drive member (510, 511) such as a rotating drive axis; one or more mechanical transmission members (52; 521-523; 524-526) for transmitting a movement of the drive member to the movable part (30) for moving the movable part; and a transmission frame (200) for supporting the motor and the movable transmission member (s). The transmission frame is an integral component (200) on which the motor and the transmission members are directly mounted.

14 Claims, 3 Drawing Sheets

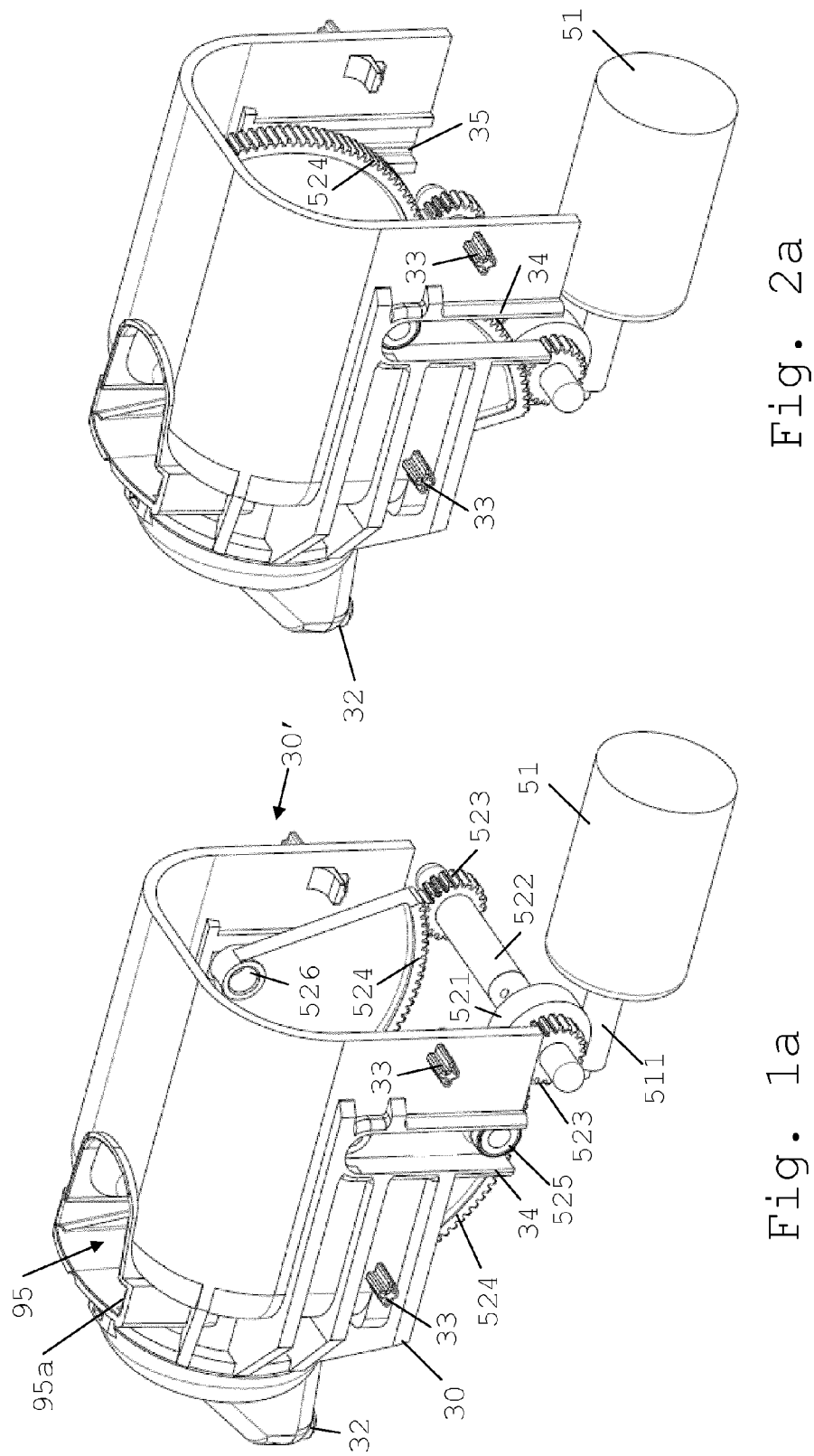

MOTORIZED BEVERAGE MACHINE WITH MECHANICAL TRANSMISSION

CROSS REFERENCE TO RELATED APPLICATIONS

The present application is a National Stage of International Application No. PCT/EP2012/050033, filed on Jan. 3, 2012, which claims priority to European Patent Application No. 11150023.7, filed Jan. 3, 2011, the entire contents of which are being incorporated herein by reference.

FIELD OF INVENTION

The field of the invention pertains to motorized beverage preparation machines, in particular using capsules of an ingredient of the beverage to be prepared, such as beverage preparation machines having a motorized ingredient chamber that can be opened and closed for inserting a beverage ingredient into the chamber and/or removal of a used ingredient therefrom.

For the purpose of the present description, a "beverage" is meant to include any human-consumable liquid substance, such as tea, coffee, hot or cold chocolate, milk, soup, baby food, etc. . . . A "capsule" is meant to include any pre-portioned beverage ingredient, such as a flavouring ingredient, within an enclosing packaging of any material, in particular an airtight packaging, e.g. plastic, aluminium, recyclable and/or biodegradable packagings, and of any shape and structure, including soft pods or rigid cartridges containing the ingredient.

BACKGROUND ART

Certain beverage preparation machines use capsules containing ingredients to be extracted or to be dissolved and/or ingredients that are stored and dosed automatically in the machine or else are added at the time of preparation of the drink. Some beverage machines possess filling means that include a pump for liquid, usually water, which pumps the liquid from a source of water that is cold or indeed heated through heating means, e.g. a thermoblock or the like.

Especially in the field of coffee preparation, machines have been widely developed in which a capsule containing beverage ingredients is inserted in a brewing device. The brewing device is tightly closed about the capsule, water is injected at the first face of the capsule, the beverage is produced in the closed volume of the capsule and a brewed beverage can be drained from a second face of the capsule and collected into a receptacle such as a cup or glass.

Brewing devices have been developed to facilitate insertion of a "fresh" capsule and removal of the capsule upon use.

WO 2005/004683 and WO 2007/135136 relate to such brewing devices. The devices comprise a frame, a fixed holding part for the capsule, a movable holding part which is mounted relative to the frame in a sliding relationship, one or two knuckle joint mechanisms that provide a mechanical system which enables to close in a steady and fluid-tight manner the holding parts about the capsule while also resisting to the counter-force acting while re-opening and generated by the internal brewing pressure, and a handle for directly levering the knuckle joint mechanism. Such a device forms a simple assembly enabling insertion of the capsule by vertical fall through a passage in the frame and removal of the used capsule in the same direction as the insertion direction. The handle may serve to cover and uncover the passage for the capsule. The movable parts of the brewing device are actuated manually via the handle. The manual force required to move the movable parts varies during closure and opening of the machine and depends on the dimensional tolerances of the capsules used and the positioning and nature of the capsules as well as the temperature of the brewing unit.

WO 2009/043630 discloses a beverage preparation machine including a brewing unit having a front part with a passage for inserting a capsule into the brewing unit. The front part is arranged to telescope out of the machine's housing for uncovering the passage for inserting a capsule into the brewing unit and telescopes into the brewing unit for sliding the passage under the housing and thus covering the passage by the housing.

From a different approach, the actuation of the movable part of the brewing device may be motorized. Such a system is for example disclosed in EP 1 767 129. In this case, the user does not have to provide any manual effort to open or close the brewing device. The brewing device has a capsule insertion passage provided with a safety door assembled to the movable part of the brewing device via a switch for detecting an undesired presence of a finger in the passage during closure and prevent injuries by squeezing.

SUMMARY OF THE INVENTION

The invention relates to a machine for preparing and dispensing a beverage. For instance, the machine is a coffee, tea, chocolate, cacao, milk or soup preparation machine. In particular, the machine is arranged for preparing within a beverage processing module a beverage by passing hot or cold water or another liquid through a capsule containing an ingredient, such as a flavouring ingredient, of the beverage to be prepared, such as ground coffee or tea or chocolate or cacao or milk powder.

Such beverage preparation typically includes the mixing of a plurality of beverage ingredients, e.g. water and milk powder, and/or the infusion of a beverage ingredient, such as an infusion of ground coffee or tea with water. For instance, a predetermined amount of beverage is formed and dispensed on user-request, which corresponds to a serving. The volume of such a serving may be in the range of 25 to 200 ml, e.g. the volume for filling a cup or mug, depending on the type of beverage. Formed and dispensed beverages may be selected from ristrettos, espressos, lungos, cappuccinos, café latte, americano coffees, teas, etc. . . . In particular, a coffee machine may be configured for dispensing espressos, e.g. an adjustable volume of 20 to 60 ml per serving, and/or for dispensing lungos, e.g. a volume in the range of 70 to 150 ml per serving.

In particular, the beverage preparation machine includes: a first part and a second part movable relative to the first part; a motor having a drive member such as a rotating drive axis e.g. an axle or shaft; one or more mechanical transmission members for transmitting a movement of the drive member to the movable part for moving the movable part; and a transmission frame for supporting the motor and said one or more movable transmission members.

The second part typically cooperates with the first part for forming an ingredient processing module. For instance, the movable (second) part is relatively movable by the motor from a position for housing an ingredient in the processing module to a transfer position for inserting said ingredient into the processing module and/or for evacuation thereof from the processing module. The ingredient processing module can comprises and/or be associated with an ingredient capsule handling arrangement, in particular an arrangement for receiving and positioning an ingredient capsule in the processing module, and an arrangement for evacuating a capsule from the processing module. Optionally, the processing module comprising a capsule opener for opening a capsule in the processing module. The first part may include a portion that is fixed to the transmission frame, in particular a portion that is integral with the transmission frame. The first part optionally comprises a displaceable part to seal the ingredient within the processing module.

As mentioned above, the ingredient is typically inserted in a preportioned form within a capsule.

In accordance with the invention, the transmission frame is an integral component on which the motor and said one or more transmission members are directly mounted.

In other words, the motor and the transmission members are relatively positioned one to another via a single mechanical support element, the integral transmission frame. Hence, the transmission frame is not made up of an assembly of components that need to be individually manufactured and then positioned to one another during assembly with acceptable tolerances. For instance, the integral transmission frame is made of plastic or metal and/or is manufactured by casting in a single mould with or without fine-machining or by machining a single block of material. Hence, assembly of the transmission members and the transmission frame and the motor is simplified and the assembly tolerances are tightened. It follows that the system is more reliable in view of the improved relative positioning of the mechanically interacting relatively moving components and less exposed to jamming or generating other nuisances. The contact points along the mechanical interacting chain of different relatively movable elements reaching from the motor to the movable (second) part via the transmission members can be maintained within tight tolerances in serial production. Hence, the entire system can be produced with higher quality standards, e.g. generating less noise or malfunction or increased friction wear during use. This is a particular advantage when a high speed motor is used, e.g. operating normally above 100, e.g. in the range of 500 to 5000 rpm such as 1000 to 3000 rpm.

Moreover, the movable (second) part may also be mounted, in particular slidably and/or rotatably mounted, on the integral transmission frame. This further reduces the problem of manufacturing and assembly tolerances by avoiding the manufacturing and assembling and positioning of additional intermediate components.

The transmission frame may have a bearing part for supporting the drive member of the motor and permitting movements thereof relative to the transmission frame. The motor may have a motor frame, such as a motor housing, which is fixed to the transmission frame, the transmission frame having in particular an integral seat for receiving the motor frame.

It is sufficient to position the motor on the transmission frame via the motor's stationary structure, e.g. by fixing the motor frame, or via the drive member by a bearing. Although generally not preferred in view of possible jamming issues, the motor may be mounted to the frame via both its stationary structure and the drive member, for example when there is significant free and useless positioning play between the stationary structure and the drive member. In a further embodiment, the stationary structure or housing of the motor can be made integral with the transmission frame.

The transmission frame may have one or more bearing parts, in particular parts delimiting bearing surfaces, for supporting said one or more mechanical transmission members and permitting movements thereof relative to the transmission frame for moving the movable part by the drive member via the moving mechanical transmission member(s). For example, each of said one or more mechanical transmission members is directly connected to the transmission frame by a bearing arrangement selected from plain bearings, rolling-element bearings, fluid bearings, magnetic bearings and flexure bearings.

The said one or more mechanical transmission members can comprise at least one of gears, such as friction gears, spur gears, helical gears, bevel gears and worm gears, and racks and pinions. The said one or more mechanical transmission members may comprise at least one of a cam and/or cam follower arrangement, in particular connecting the mechanical transmission member(s) with the movable (second) part.

The drive member may form or be fixed to a worm gear that engages with a first gear as one of the mechanical transmission member(s). The gear ratio between the worm gear and the first gear of the mechanical transmission member(s) may be in the range of 1:20 to 1:200 such as 1:50 to 1:100, e.g. 1:60 to 1:80. The mechanical transmission member(s) can include a first gear driven by the motor and engaging with a second gear directly or indirectly via an intermediate gear, in particular the second gear engaging with and driving the movable (second) part via a cam and cam follower arrangement. The gear ratio of the gear chain formed by the mechanical transmission members may be in the range of 1:1 to 1:20 such as 1:2 to 1:10, e.g. 1:4 to 1:8.

Overall, the gear ratio from the motor to the (second) movable part may be in the range of 1:10 to 1:5000, in particular in the range of 1:50 to 1:1000 such as 1:100 to 1:750, e.g. 1:250 to 1:500.

Hence, via such a reliable transmission system, the force generated by the motor can be significantly amplified at the level of the (second) movable part while the speed is correspondingly reduced.

Typically, the transmission frame is directly or indirectly fixed to a housing of the machine. The movable part may cooperate with the first part for forming an ingredient processing module, as mentioned above.

The ingredient processing module can be configured to circulate automatically such a carrier liquid, such as water e.g. heated water, into the cavity containing the (flavouring) ingredient when the first and second parts reach the processing position, e.g. the position for housing the ingredient in the processing module. Circulation of the liquid may also be triggered by a user-request upon reaching the processing position.

Thus, the invention also relates to a use of an ingredient capsule for a machine as described above.

The capsule may have a generally cup-shaped body for containing a beverage ingredient, such as a flavouring ingredient e.g. instant or ground coffee, instant or tea leaves, chocolate, cacao, powder or liquid milk, etc. . . . , and a lid. In particular, the cup-shaped body has a rim to which the lid is attached. The capsule may be air-tight before use and opened during use, e.g. by pre-piercing and/or under the effect of a pressure rise in the capsule, e.g. due to a liquid such as water in particular heated water circulated into the capsule.

BRIEF DESCRIPTION OF THE DRAWINGS

The invention will now be described with reference to the schematic drawings, wherein:

FIGS. 1a and 2a illustrate the motorization of a movable part of the processing module shown in FIGS. 1 and 2.

DETAILED DESCRIPTION

Figure 2:
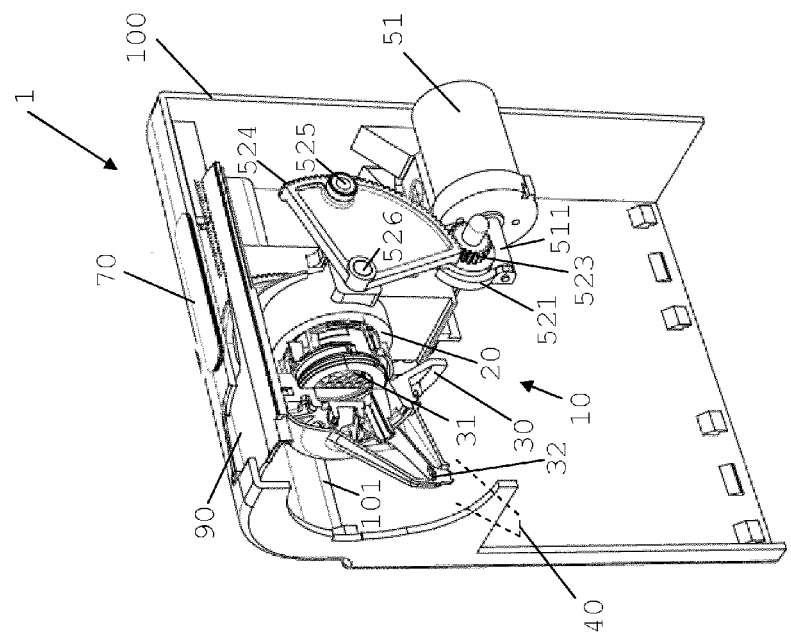
FIGS. 1 and 2 show a larger part of this beverage machine including the ingredient processing module, a motor, a control unit and a user-interface.
Figure 1:
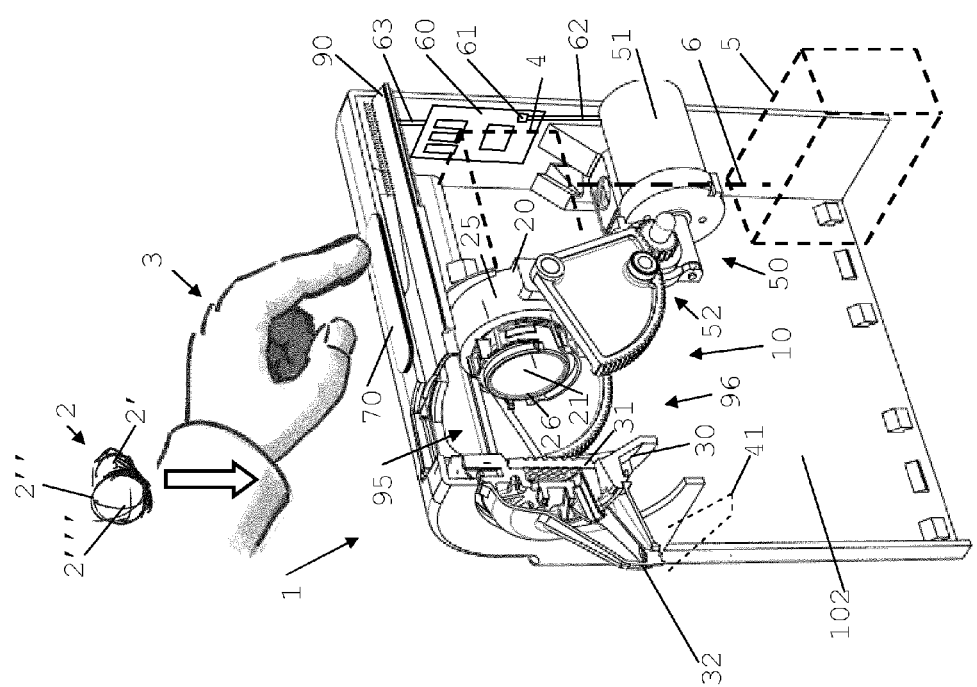

FIGS. 1 to 2a illustrate an exemplary embodiment of part of a beverage preparation machine 1 in accordance with the invention.

Machine 1 has an ingredient processing module 10 that comprises a first part 20 and a second part 30 movable relative to first part 20 from a position (FIGS. 2 and 2a) for housing and processing therein an ingredient 2 for forming a beverage to a transfer position (FIGS. 1 and 1a) for inserting such ingredient 2 into processing module 10 and/or for evacuation thereof from module 10.

For example, first part 20 can be more or less fixed in a structure 100, e.g. frame or housing, of machine 1 and second part 30 may be driven to and away from first part 20 between the transfer and the processing positions. In particular, second part 30 can be movable and has an opening 30', as indicated in FIG. 1a, that may slide back and forth over first part 20. Lateral support elements 33 are provided for guiding second part 30 in slots 101 of structure 100. First part 20 defines a chamber 21 and second part 30 has a member 31, e.g. generally shaped as a plate. Chamber 21 and member 31 are spaced apart in FIG. 1 for receiving and/or evacuating an ingredient 2 therebetween. Chamber 21 and member 31 are brought together in FIGS. 2 and 2a for delimiting an inner ingredient processing cavity for holding and housing the ingredient, such as tea or coffee or chocolate or powder milk. As mentioned above, the ingredient may be inserted pre-portioned within a capsule 2 into this cavity.

Typically, first and second parts 20,30 in their processing position can be arranged for mixing liquid, such as an incoming flow of hot water, with a flavouring ingredient, e.g. coffee or tea, to form a flavoured beverage. The flavouring ingredient may in particular be supplied as a solid, e.g. ground coffee, tea leaves, powder milk, etc. . . .

In a particular embodiment, first and second parts 20,30 form a brewing unit, e.g. of a tea or coffee machine. The flavouring ingredient may be supplied within capsule 2 into the brewing unit. The interaction between the brewing unit and the flavouring ingredient, when provided within a capsule, may be of the type disclosed in EP 1 859 714 or in EP 2 205 133.

Parts 20,30 in their processing position may be arranged for holding a pre-portioned flavouring ingredient supplied within capsule 2 while liquid is circulated therethrough to form a beverage.

A suitable flavouring capsule 2 may have a cup-shaped body 2' with a rim 2" for fixing a lid 2''' thereon, as illustrated in FIG. 1. Body 2' has a cavity configured for containing a pre-portioned amount of flavouring ingredient, e.g. from 3 to 12 g ground coffee.

When closed capsules 2 of flavouring ingredients are used, first and second parts 20,30 may include a capsule opener such as blades and/or a tearing tool, e.g. a plate with a tearing profile, for instance as known form Nespresso™ machines.

Figure 4:
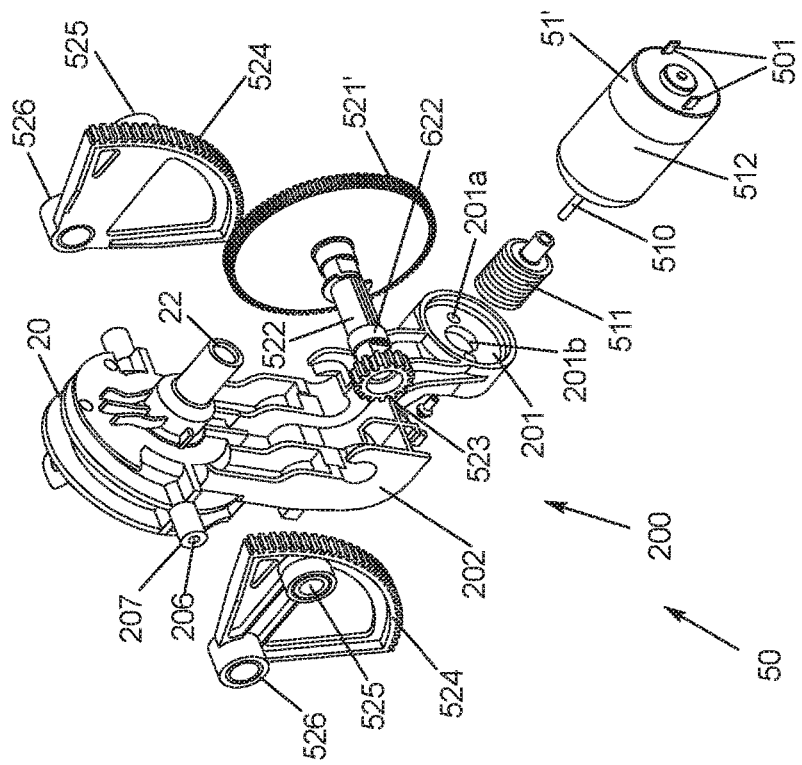
FIGS. 3 and 4 illustrate in greater details a motor and transmission parts of a beverage machine in accordance with the invention.
Figure 3:
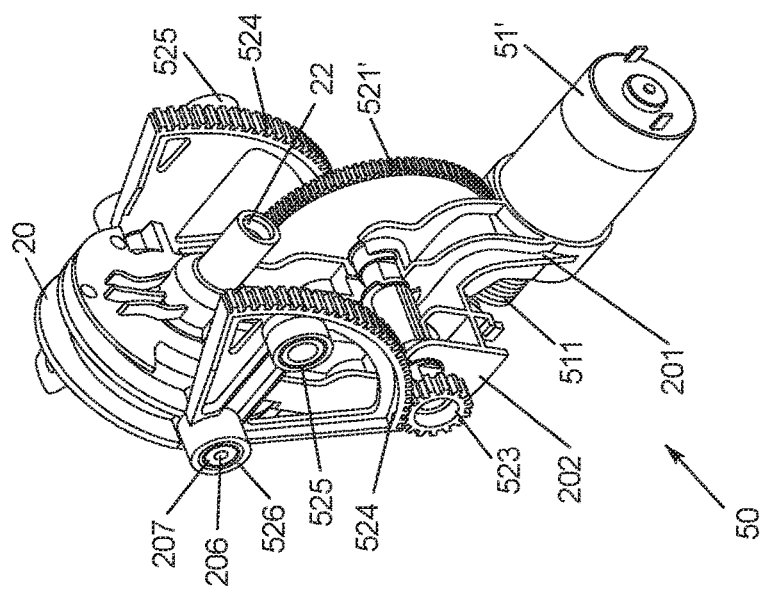

In particular, processing module 10 includes an upstream fluid arrangement connected to first part 20, e.g. via inlet 22 (illustrated in FIGS. 3 and 4). For instance, the upstream fluid arrangement incorporates, as schematically illustrated in FIG. 1, a liquid driver 5, such as a pump, and a thermal conditioner 4, such as a heater, interconnected by a conduit 6 for circulating thermally conditioned liquid, such as water, from a source, e.g. a liquid reservoir, into the ingredient processing cavity. Examples of upstream fluid arrangements are disclosed in WO 2009/074550 and in WO 2009/130099.

Moreover, processing module 10 comprises a downstream fluid arrangement with an outlet member 40 for dispensing to an area for dispensing beverage to a user, e.g. an area for placing a user-cup or a user-mug, the beverage formed in the cavity containing the ingredient mixed with the circulating liquid. The dispensing area may be delimited at the bottom by a support surface for holding a user cup or mug. Such support surfaces are well known in the art, e.g. as disclosed in EP 1 867 260 and WO 2009/074557.

Outlet member 40 is in fluid communication with the ingredient processing cavity, downstream thereof, via liquid guide member 32. Guide member 32 can be fixed to movable part 30.

Machine 1 may have a collector receptacle (not shown) for collecting used ingredients, such as tea leaves or ground coffee, e.g. within used capsules, and waste liquid. The collector receptacle, e.g. waste collector, may be located in a lower part 102 of structure 100 of machine 1 and have an upper compartment for solids and a lower compartment for liquids. Collector receptacle may be insertable, e.g. slidable, into a cavity formed in the machine and removable therefrom for servicing, e.g. emptying the solids and/or liquids contained therein. For example, the storage capacity of the collector receptacle for accumulating used ingredient may be aligned to the storage capacity of reservoir for the supply of liquid such as water, e.g. as taught in PCT/EP10/056194.

Furthermore, processing module 10 can include a drop evacuation member 41 (in dotted lines in FIG. 1) for collecting residual drops in the downstream fluid arrangement when the machine is not expected to dispense a beverage, typically when processing module 10 is in the transfer position as illustrated in FIG. 1. Evacuation member 41 is configured to be in fluid configuration with liquid guide member 32 and arranged to evacuated liquid therefrom into a service unit located inside machine 1 generally underneath processing module 10. For example, the service unit is of the type of the above discussed collector receptacle.

The collector receptacle can be positioned underneath parts 20,30 to collect upon beverage preparation the used flavouring ingredient, e.g. ground coffee or tea, evacuated to the receptacle via an ingredient evacuation passage 96, e.g. by gravity. The receptacle typically has an anti-clogging arrangement, as for example taught in WO 2009/074559 and in WO 2009/135869, which are hereby incorporated by way of reference.

Ingredient processing module 10 can be configured to circulate automatically the liquid into the cavity containing the ingredient, optionally within a capsule, when first and second parts 20,30 reach the processing position for housing the ingredient. An automatic ingredient recognition system may be used to parameterize the processing of the ingredient automatically.

Beverage machine 1 typically includes one or more of the following components:
a) Processing module 10, e.g. a fluid circuit including a brewing unit, delimiting in the processing position an inner flavouring chamber for receiving and housing an ingredient of the beverage such as a flavouring ingredient, in particular a pre-portioned ingredient supplied within capsule 2, and for guiding via an inlet an incoming flow of liquid for flavouring thereof, such as water, through this ingredient to a beverage outlet;

b) an in-line heater 4 for heating this flow of liquid to be supplied to ingredient 2;

c) a pump 5 for pumping liquid through the in-line heater;

d) one or more fluid connecting members 6 for guiding liquid from a source of liquid, such as tank of liquid;

e) an electric control unit 60, in particular comprising a printed circuit board (PCB), for receiving instructions from a user via an input user-interface 70 and for controlling the in-line heater and the pump; and/or f) one or more sensors for sensing at least one characteristic selected from characteristics of processing module 10, in-line heater 4, pump 5, the liquid tank, an ingredient collector, a flow of the liquid (e.g. by a flowmeter), a pressure of the liquid and a temperature of the liquid, and for communicating such characteristic(s) to control unit 60.

Heater 4 may be a thermoblock or an on demand heater (ODH), for instance an ODH type disclosed in EP 1 253 844, EP 1 380 243 and EP 1 809 151. Examples of suitable brewing units and capsule management are for example disclosed in WO 2005/004683, WO2007/135136 and WO 2009/043630, which are hereby incorporated by way of reference. Suitable fluid circuits of beverage preparation modules are for instance disclosed in WO 2009/074550 and WO 2009/130099, which are hereby incorporated by way of reference.

Furthermore, in this particular embodiment of the invention, machine 1 includes an automatic actuator 50 for relatively moving first and second parts 20,30 from the processing position for housing ingredient 2 (FIGS. 2, and 2a) to the transfer position (FIGS. 1 and 1a) and/or vice versa. Actuator 50 comprises an electric motor 51 and mechanical transmission members 521-523;524-526 for transmitting movements from motor 51 into relative movements between first and second parts 20,30.

In particular, movements of motor 51, e.g. rotational movements of drive axis 510 with worm gear 511, are converted into movements of movable part 30, e.g. translational movements, via mechanical transmission member(s) 52;521-523;524-526.

FIGS. 1a and 2a illustrate motor 51 and mechanical transmission member(s) 52 driving downstream part 30 from the transfer position (FIG. 1a) to the processing position (FIG. 2a).

In particular, the mechanical transmission member(s) may include a gear, e.g. toothed gear, and/or cam arrangement. For instance, mechanical transmission member(s) 52 includes a toothed wheel 521 that engages with a worm gear 511 formed or fixed on the rotating drive axis 510 of motor 51. Toothed wheel 521 is fixed via rod 522 to a pair of transmission toothed wheels 523. Latter wheels 523 engage with corresponding toothed wheels 524, e.g. wheel sectors, that bear each a cam-follower 525 for cooperation with a cam 34 of movable second part 30 of processing module 10.

Furthermore, machine 1 has a control unit 60 (illustrated in FIG. 1) for controlling motor means 50 to relatively move first and second parts 20,30. Typically, control unit 60, e.g. a printed circuit board (PCB) with a controller or processor and memory device etc. . . . , is electrically connected via a regulator 61 and an appropriate electric connection 62 to motor 51.

Machine 1 also includes a user-interface 70 connected to control unit 60, e.g. via an appropriate electric connection 63. User-interface 70 is arranged for sensing a user-request, e.g. with the aid of a hand or finger 3, to relatively move first and second parts 20,30 by motor means 50 controlled by control unit 60. For instance, user-interface is a touch-sensitive interface, e.g. a push button or a capacitive button or a piezoelectric button.

In the particular example illustrated in the appended Figures, first and second parts 20,30 are relatively movable by motor 51 in a linear direction, namely in a straight direction. Alternatively, the first and second parts can be relatively movable by the motor means in an arched direction, or in an arched and linear direction, e.g. sequentially arched and then linear and/or vice versa.

Typically, machine 1 has a stationary structure 100, such as a housing and/or a frame, the second part 30 being movable by motor 51 relative to the first part and relative to the stationary structure. The first part may include a fixed structure 25, in particular including a hydraulic cylinder, and a secondary structure 26, such as a hydraulic piston member including an ingredient or capsule cage. Secondary structure 26 may be slightly movable relative to fixed structure 25, for example to adjust the closing distance between first and second relatively movable parts 20,30, e.g. to ensure proper handling of ingredient/capsule 2 inserted therebetween. Examples of such hydraulic positioning are for instance disclosed in EP 2 142 054.

The exemplary embodiment of machine 1 according to the invention has an ingredient passage 95,96 with an insertion portion 95 for inserting ingredient 2 into the processing module 10 and an evacuation portion 96 for evacuating ingredient 2 therefrom.

Ingredient gate 90 is associated with ingredient passage 95,96 and is driven by motor 51, e.g. via movable second part 30, between a position (FIG. 1) opening and a position (FIG. 2) closing passage 95,96.

Gate 90, e.g. a generally plate-like member, can be drivable in a generally horizontal direction, movable part 30 being optionally movable in a horizontal direction. Alternatively, the gate can be made pivotable optionally in combination with a linearly movable second part, or vice versa. In the latter case, a linear movement is converted into a rotational movement, or vice versa, by the intermediate mechanical conversion mechanism, e.g. by means of a wheel and a cooperating rack only.

Gate 90 may be configured to support in the closed position ingredient 2, especially contained within a capsule, and to free ingredient 2 into or out of the passage 95,96 when gate 90 is moved into the open position.

In the transfer position (FIGS. 1 and 1a), machine 1 may have guides 95a for guiding capsule rim 2" during insertion of capsule 2 into processing module 10. Capsule 2 may travel along insertion passage 95 under the effect of gravity. Stop members (not shown) may be provided to hold capsule 2 in an intermediate position inbetween first and second parts 20,30 until these parts 20,30 are moved together to close the processing chamber 21 about capsule 2. When parts 20,30 are moved apart, the capsule contained in the processing chamber is evacuated via evacuation passage 96. Suitable examples of handling of such capsule, e.g. from the insertion to the evacuation and the action of the first and second parts and the stop members, is illustrated in greater details in EP 1 646 305 and EP 2 205 133.

Hence, machine 1 may include an outermost housing 100 and ingredient passage 95,96 can extend from outermost housing 100 to ingredient processing module 10, the gate 90 being movable along a portion of housing 100 generally parallel thereto, as shown in FIGS. 1 and 2.

In accordance with the invention, machine 1 has a transmission frame 200 that is an integral component on which motor 51 and the transmission members 52 are directly mounted.

The relationship between movable part 30, transmission frame 200, motor 51,51', transmission members 52 shown in FIGS. 1 to 4 will now be discussed in greater details.

In the exemplary embodiment illustrated in the appended Figures, frame 200 is integral with first part 20 of the processing unit. Frame 200 may or may not be directly fixed to a housing or stationary structure of machine 1. Alternatively, in a less preferred embodiment, the transmission frame and first part are distinct components that may or may not be directly fixed together. The transmission frame may be fixed or integral with a housing of the beverage machine.

As illustrated, movable part 30 can be mounted, in particular slidably and/or rotatably mounted, on first part 20 via opening 30'. Hence, movable part 30 is movably mounted on first part 20 the transmission frame 200 via integral first part 20.

The transmission frame 200 has a fixing part forming an integral seat 201 for fixing a motor frame, such as a motor housing (512) of motor 51' (FIG. 4). Motor 51' may be fixed to seat 201 by screws extending via through holes 201a in seat 201.

Motor 51' has a pair of electric connectors 501 for powering and control. For instance, motor 51' is a synchronous motor or a direct current (DC) motor. Motor 51' has a drive axle or shaft 510 on which a worm gear 511 is secured, e.g. by force-fitting. Axle or shaft 510 extends via through opening 201b in seat 201. In a less preferred embodiment, an additional bearing may be provided between the seat and the axle or shaft. Alternatively, the motor may be secured to the seat only or mainly by the axle or shaft, in which case a bearing between the axle or shaft and the seat is preferred.

Transmission frame 200 has bearing parts for supporting and positioning transmission elements 202,206.

A first gear in the form of a toothed wheel 521,521' engages with worm gear 511 and is integral with or fixed to shaft 522. A plain bearing 622 is provided between shaft 522 and bearing part 202 of transmission frame 200. To facilitate assembly, shaft 522 may simply be snapped into bearing part 202 of transmission frame 200.

An intermediate toothed wheel 523 is also fixed to or integral with shaft 522 and engages with second toothed wheel 524. Toothed wheel 523 is smaller than wheel 521, 521' to reduce the overall speed transmission ratio and increase the force transmission ratio. Second toothed wheel 524 may be mounted on pin or shaft 206 of transmission frame 200. Pin or shaft 206 may form a plain bearing 207 with opening 526 in wheel 524. In view of the extent of movement at the end of the transmission chain 521,521', 523,524 of this particular embodiment, a wheel sector 524, e.g. a sector of about 90°, may be sufficient to transmit the entire converted displacement from motor 51,51' to movable part 30.

Wheel 524 and movable (second) part 30 are connected by a cam 34 cam follower 525 arrangement to convert the rotational displacement of wheel 524 into a translational displacement of part 30.

Many alternatives regarding the type of transmission chain and bearing are contemplated.

In particular, the transmission speed and force ratios may be adapted as required for any particular embodiment. For example, first wheel 521 shown in FIGS. 1 to 2a is smaller than first wheel 521' in FIGS. 3 and 4. It follows that the transmission speed of the embodiment shown in FIGS. 1 to 2a will be higher than the transmission speed of the modified embodiment shown in FIGS. 3 and 4. To obtain the same speed and force of displacement of movable part 30, motor 51 will be dimensioned to provide a higher couple at lower speed than motor 51' which will be dimensioned to provide a lower couple at higher speed.

In general, the mechanical transmission member(s) from the motor to the movable (second) part will have an overall gear ratio in the range of 1:10 to 1:5000.

The invention claimed is:

1. A machine for preparing a beverage, the machine comprising:
    a motor having a drive member; a first part and a second part movable relative to the first part, the second part is configured to cooperate with the first part for forming an ingredient processing module, and the second part is relatively movable by the motor from a position for housing an ingredient in the ingredient processing module to a transfer position for inserting the ingredient into the ingredient processing module and/or for evacuation thereof from the ingredient processing module
    one or more mechanical transmission members configured to transmit a movement of the drive member to the second part for moving the second part; and
    a transmission frame configured to support the motor and the one or more mechanical transmission members, the transmission frame is an integral component on which the motor and the one or more mechanical transmission members are directly mounted.

2. The machine of claim 1, wherein the ingredient processing module comprises and/or is associated with an ingredient capsule handling arrangement.

3. The machine of claim 1, wherein the first part comprises a portion that is fixed to the transmission frame.

4. The machine of claim 1, wherein the transmission frame has a fixing part configured to fix a motor frame, the fixing part having an integral seat configured to receive the motor frame.

5. The machine of claim 1, wherein the second part is mounted on the transmission frame.

6. The machine of claim 1, wherein the transmission frame has a seat configured to support the drive member and permit movements the drive member relative to the transmission frame for moving the second part by the drive member via the one or more mechanical transmission members.

7. The machine of claim 1, wherein the transmission frame has one or more bearing parts configured to support the one or more mechanical transmission members and permit movements the one or more mechanical transmission members relative to the transmission frame for moving the second part by the drive member via the one or more mechanical transmission members.

8. The machine of claim 7, wherein each of the one or more mechanical transmission members is directly connected to the transmission frame by the one or more bearing parts selected from the group consisting of plain bearings, rolling-element bearings, fluid bearings, magnetic bearings and flexure bearings.

9. The machine of claim 1, wherein the one or more mechanical transmission members comprise at least one gear.

10. The machine of claim 1, wherein the one or more mechanical transmission members comprise at least one cam and/or cam follower arrangement.

11. The machine of claim 1, wherein the drive member forms or is fixed to a worm gear that engages with a first gear as one of the one or more mechanical transmission members.

12. The machine of claim 1, wherein the one or more mechanical transmission members comprise a first gear engaging with a second gear directly or indirectly via an intermediate gear.

13. The machine of claim 1, wherein the one or more mechanical transmission members have a gear ratio of at least 1:2.

14. The machine of claim 1, wherein the transmission frame is directly or indirectly fixed to a housing of the machine.

* * * * *